US009319499B2

(12) United States Patent
Wilson et al.

(10) Patent No.: US 9,319,499 B2
(45) Date of Patent: *Apr. 19, 2016

(54) WEARABLE ULTRA-THIN MINIATURIZED MOBILE COMMUNICATIONS

(71) Applicant: DIGITALOPTICS CORPORATION EUROPE LIMITED, San Jose, CA (US)

(72) Inventors: Stuart E. Wilson, Menlo Park, CA (US); Ilyas Mohammed, Santa Clara, CA (US); Charles White, Los Altos, CA (US); Hari Chakravarthula, San Jose, CA (US)

(73) Assignee: FotoNation Limited, Ballybrit, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,149

(22) Filed: Jan. 9, 2014

(65) Prior Publication Data
US 2014/0308987 A1    Oct. 16, 2014

Related U.S. Application Data

(60) Continuation of application No. 13/442,552, filed on Apr. 9, 2012, now Pat. No. 8,630,658, which is a division of application No. 12/006,053, filed on Dec. 28, 2007, now Pat. No. 8,155,663.

(60) Provisional application No. 60/923,478, filed on Apr. 13, 2007.

(51) Int. Cl.
*H04M 1/00* (2006.01)
*H04M 1/02* (2006.01)
*H04M 1/05* (2006.01)
*H04M 1/60* (2006.01)
*H04M 1/725* (2006.01)

(52) U.S. Cl.
CPC .......... *H04M 1/0264* (2013.01); *H04M 1/0202* (2013.01); *H04M 1/026* (2013.01); *H04M 1/0279* (2013.01); *H04M 1/05* (2013.01); *H04M 1/6066* (2013.01); *H04M 1/7253* (2013.01); *H04M 2250/02* (2013.01); *H04M 2250/12* (2013.01); *H04M 2250/52* (2013.01)

(58) Field of Classification Search
CPC .......................... H04N 5/232; H04N 1/00403
USPC ............ 455/456.1, 575.2, 556.1, 575.1, 41.3, 455/418, 556.2, 90.2; 381/384, 315; 348/14.02, 207.99, 164, 376, 372
See application file for complete search history.

(56) References Cited

U.S. PATENT DOCUMENTS

| 6,385,468 | B2 | 5/2002 | Arnold |
| 6,610,934 | B2 | 8/2003 | Yamaguchi et al. |
| 6,791,178 | B2 | 9/2004 | Yamaguchi et al. |
| 7,855,879 | B2 | 12/2010 | Kim |
| 2002/0180015 | A1 | 12/2002 | Yamaguchi et al. |
| 2004/0109588 | A1* | 6/2004 | Houvener ............ 382/116 |
| 2005/0118990 | A1* | 6/2005 | Stephens ............. 455/418 |

(Continued)

*Primary Examiner* — Kiet Doan
(74) *Attorney, Agent, or Firm* — Hickman Palermo Becker Bingham LLP

(57) ABSTRACT

A device is provided with a housing adapted to engage a portion of a head of a user, such as the ear of the user. The device includes a camera component adapted to face in the same direction as the user when engaged with the portion of the head of the user. The device may be adapted to be controlled using voice commands from the user.

19 Claims, 5 Drawing Sheets

(56) References Cited

U.S. PATENT DOCUMENTS

| | | | |
|---|---|---|---|
| 2005/0278446 A1* | 12/2005 | Bryant | ........................... 709/227 |
| 2006/0252470 A1 | 11/2006 | Seshadri et al. | |
| 2007/0010282 A1 | 1/2007 | Dates | |
| 2009/0247245 A1* | 10/2009 | Strawn | .................... H04M 1/05 455/575.2 |
| 2010/0245585 A1* | 9/2010 | Fisher | ................. H04M 1/6066 348/164 |

* cited by examiner

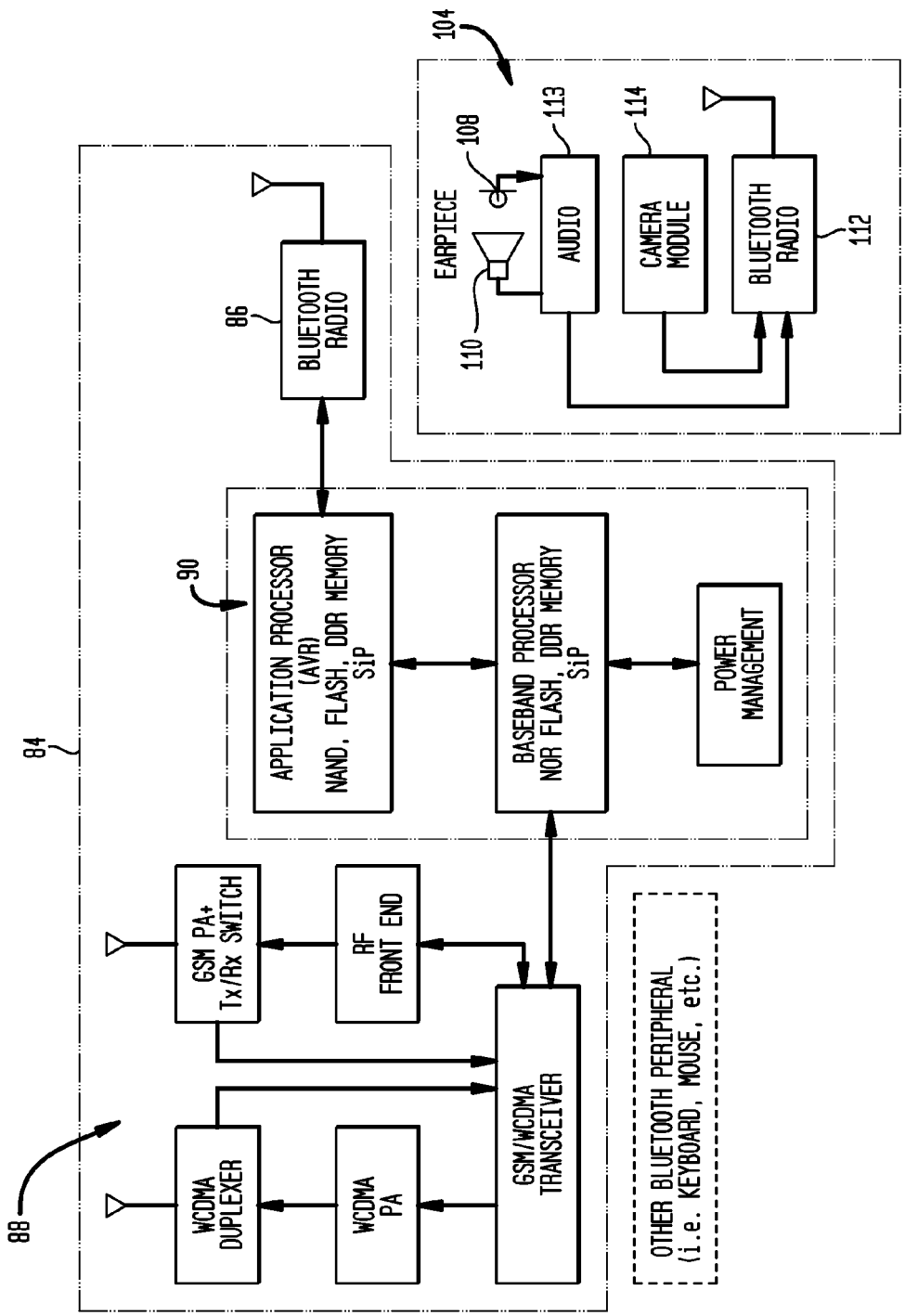

WEARABLE ULTRA-THIN MINIATURIZED MOBILE COMMUNICATIONS

CROSS-REFERENCE TO RELATED APPLICATIONS

The present application is a continuation of patent application Ser. No. 13/442,552, filed Apr. 9, 2012, which is a divisional of U.S. patent application Ser. No. 12/006,053, filed Dec. 28, 2007, and claims benefit of the filing date of U.S. Provisional Patent Application No. 60/923,478, filed Apr. 13, 2007, the disclosures of which are hereby incorporated by reference herein.

BACKGROUND OF THE INVENTION

The present invention relates to mobile communication devices such as cellular telephones, personal digital assistants ("PDAs") and the like, and to structures useable in such devices.

Considerable effort has been devoted in the art to making mobile communication devices, notably, cellular telephones, smaller and thus easier to carry. However, still further improvement would be desirable.

SUMMARY OF THE INVENTION

One aspect of the invention provides a mobile communications device which includes a casing adapted to be carried unobtrusively on a user, as for example, in or under clothing worn by the user. The device further includes a cellular communications circuit mounted within the casing, the cellular communications circuit being operative to interact with a public cellular network; and a local communications circuit, also mounted within the casing. The local communications circuit desirably is operative to receive information representing control inputs by free space communication, and to send and receive information representing the content of a message such as a cellular telephone call by free space communications.

The mobile communications device also includes a control circuit mounted within the casing and operative to control the cellular communications circuit in response to signals representing control input received by the local communications circuit.

Most preferably, the casing is in the form of a thin, flat body having dimensions on the order of the dimensions of a standard credit card. The control circuit desirably is operative to control all of the user controllable operating functions of the cellular communications circuit in response to signals representing control inputs received by the local communications circuit. Thus, the casing can be carried in a concealed location, as for example, in a pocket or wallet, and the device can interact with auxiliary input and output devices through the free space communication provided by the local communications circuit. Merely by way of example, the local communications circuit may be a radio communications circuit, as for example, a circuit operating according to the Bluetooth system.

In normal operation, the user need not manipulate the casing or any input/output devices on the casing. The casing may be entirely devoid of input/output devices, or have only a limited number of such devices, as for example, only a switch for turning the power supply on and off, or only such a switch and controls used during setup or programming.

Essentially any input/output device capable of communicating under the communications protocol used by the local communications circuit can be used to control the mobile communications device. For example, a standard Bluetooth keyboard can be employed.

However, a further aspect of the present invention provides an accessory for a mobile communications device such as a cellular telephone. The accessory includes a housing adapted to engage an ear of a user and a wireless communications circuit mounted in the housing and adapted to communicate with a cellular telephone. An earphone is mechanically mounted to the housing and is connected to the wireless communications circuit, whereas a microphone is also mechanically mounted to the housing and also connected to the communications circuit. The device also includes an electronic camera mounted to the housing and connected to the communications circuit. In operation, the earphone receives signals representing a telephone call from the communications circuit and delivers sound to the user's ear; the microphone supplies audio signals representing the user's voice to the communications circuit, and these signals are communicated to the cellular telephone; whereas the electronic camera supplies image signals to the communications circuit, which are also communicated to the cellular telephone. Most preferably, the housing is adapted to lie to one side of the user's head, with the earphone juxtaposed with the auditory canal of the user. The accessory can be used with a communications device such as the cellular telephone discussed above.

Yet another aspect of the present invention provides a module for use in a mobile communications device. The module includes a set of chips which incorporate an application specific integrated circuit ("ASIC"), a plurality of memory chips, and an additional chip. These chips are superposed in a stack and electrically interconnected with one another. Most desirably, the module according to this aspect of the invention has a height less than about 1.7 mm, horizontal dimensions less than about 13 mm, and yet provides on the order of 400 module mounting terminals or more for connecting the module to a larger circuit panel. Desirably, the module includes an interposer having top and bottom sides which is disposed within the stack, between two of the chips. The interposer has upper terminals exposed at the top side and lower terminals exposed at the bottom side. At least some of the upper terminals are electrically connected to at least some of the lower terminals, and the connections between at least two of the chips extend through the terminals of the interposer.

The module desirably also includes a bottom unit substrate having a top side facing upwardly toward the interposer, a bottom side facing downwardly away from the interposer, and top side interconnection terminals exposed at the top side of the substrate. The bottom unit substrate desirably also has chip connection terminals and module mounting terminals exposed at the bottom side of the bottom unit substrate. One of the chips in the stack, most preferably the ASIC, is mounted to the top side of the bottom unit substrate, whereas another one of the chips is mounted to the bottom side of the bottom unit substrate. At least some of the top side interconnection terminals of the bottom unit substrate are connected to the interposer. The module mounting terminals exposed at the bottom side of the interposer are left unoccupied so that these terminals can be used for connecting the module as a whole to the larger circuit panel. Most desirably, the additional chip is provided as part of a chip scale package which has a CSP substrate carrying CSP terminals, the additional chips being carried on the CSP substrate and electrically connected to the CSP terminals, the CSP terminals being bonded to the bottom side chip connection terminals of the bottom unit substrates. The memory chips desirably are provided in association with memory chip substrates. The memory chip substrates and memory chips desirably form a part of the stack overlying the top side of the interposer. The interposer may incorporate passive components such as decoupling capacitors.

These and other aspects, features and advantages of the present invention will be more readily apparent from the detailed description set forth below, taken in conjunction with the accompanying drawings.

BRIEF DESCRIPTION OF THE DRAWINGS

FIG. 9 is a functional block diagram of a cellular telephone and accessory.

DETAILED DESCRIPTION

Figure 6:
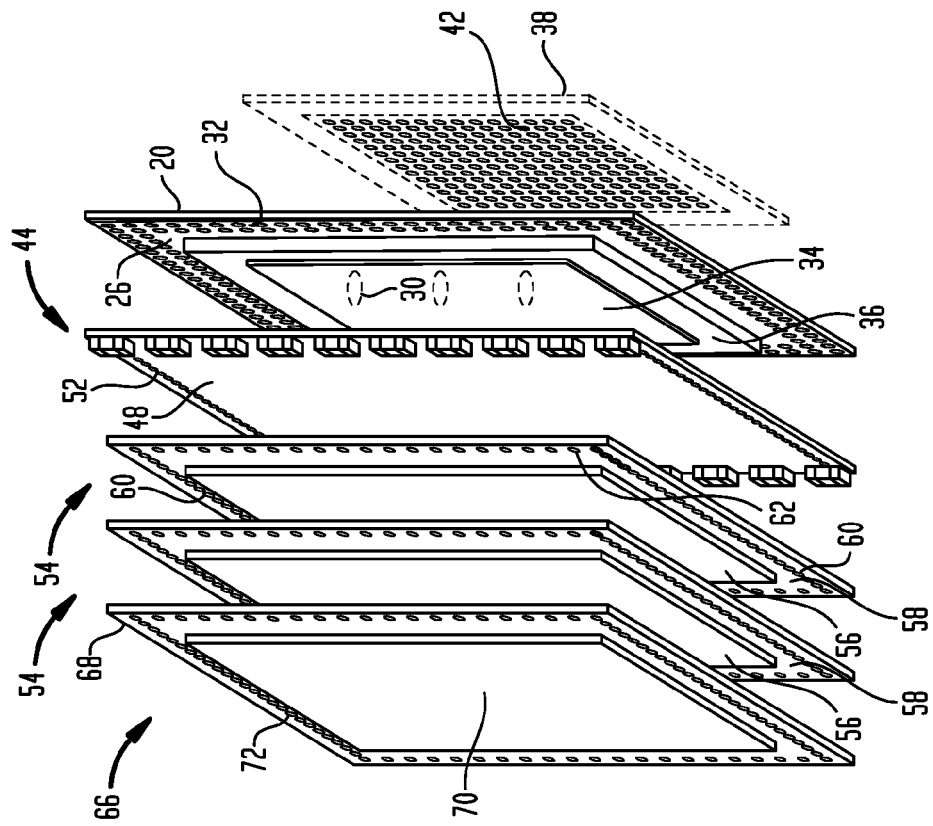
FIG. 6 is a further exploded view of the module shown in FIGS. 1-5.
Figure 5:
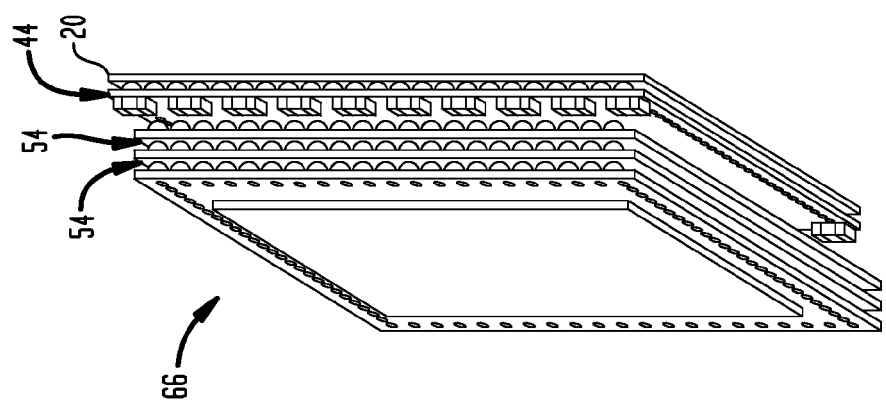
FIG. 5 is a diagrammatic top perspective view of the module shown in FIGS. 1-4.

A module according to one embodiment of the invention incorporates a bottom unit substrate 20 having a bottom side 22 (FIG. 4) and a top side 26 (FIG. 6). The bottom unit substrate may be a thin circuit panel, as for example, a flexible circuit panel. The bottom unit substrate has bottom side chip connection terminals 27 disposed in a densely packed array in a central region of the substrate, and exposed at the bottom surface 22. Merely by way of example, the bottom unit substrate may have more than 100 bottom chip connection terminals, as for example, about 100-200 bottom chip connection terminals 27. The bottom unit substrate also has a large number of module mounting terminals 28 disposed in a peripheral region of the substrate, and also exposed at the bottom surface 22 of the substrate. For example, more than 400 module mounting terminals may be provided. The particular unit illustrated in FIG. 4 has approximately 480 module mounting terminals 28. In the particular unit illustrated, the module mounting terminals are disposed adjacent all four edges of the bottom unit substrate 20, but other arrangements are possible.

The bottom unit substrate 20 also has top side chip connection terminals 30 exposed at its top surface 26. Only a few of the top side chip connection terminals 30 are depicted in FIG. 6. In practice, these top side chip connection terminals are provided in a closely packed array similar to the array of bottom side chip connection terminals 27, although not necessarily at the same spacings. The top side chip connection terminals are disposed in an array in the central region of the substrate, close to and desirably overlying, at least in part, the array of bottom side chip connection terminals 27. This facilitates short interconnections between the top side and bottom side chip connection terminals. The bottom unit substrate 20 further has top side interconnection terminals 32 disposed in a peripheral region of the substrate, and exposed at the top surface 26. The top side interconnection terminals 32 typically are fewer in number than the module mounting terminals 28, and desirably are disposed at larger center-to-center spacings or pitch than the module interconnection terminals 28.

An ASIC 34 overlies the top surface 26 of the bottom unit substrate 20. The ASIC has contacts bonded to the top chip connection terminals 30 of the bottom unit substrate. The ASIC is covered by an encapsulant 36. ASIC 34 is arranged to perform a function useful in operation of a mobile communications device, as for example, base band processing or application processing. "Base band processing" refers to processing of information constituting a message to be conveyed by the communications device, as for example, processing audio information in the case of a cellular telephone. "Application processing" refers to processing of information used in operation of the mobile communications device itself, as for example, information used to convert input data representing control inputs from a user into signals to be provided to individual components of the mobile communications device to control those components.

Figure 1:
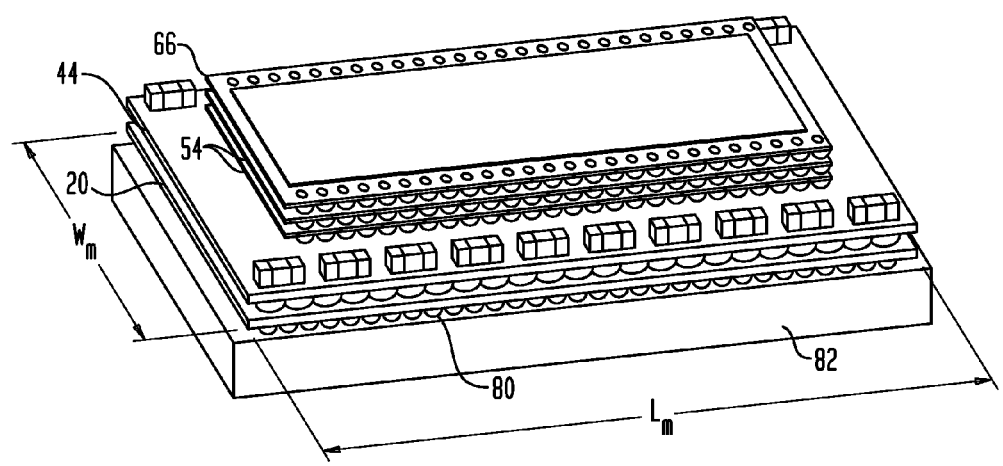
FIG. 1 is a diagrammatic perspective view depicting a module in accordance with one embodiment of the invention in conjunction with a portion of a circuit panel.
Figure 2:
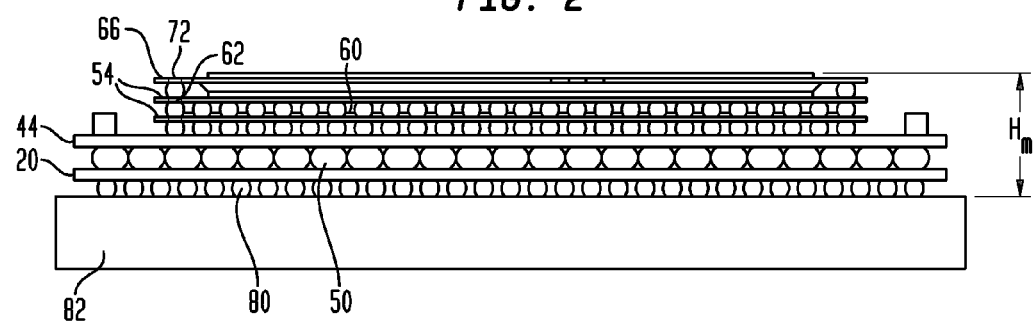
FIG. 2 is a diagrammatic elevational view of the module depicted in FIG. 1.
Figure 4:
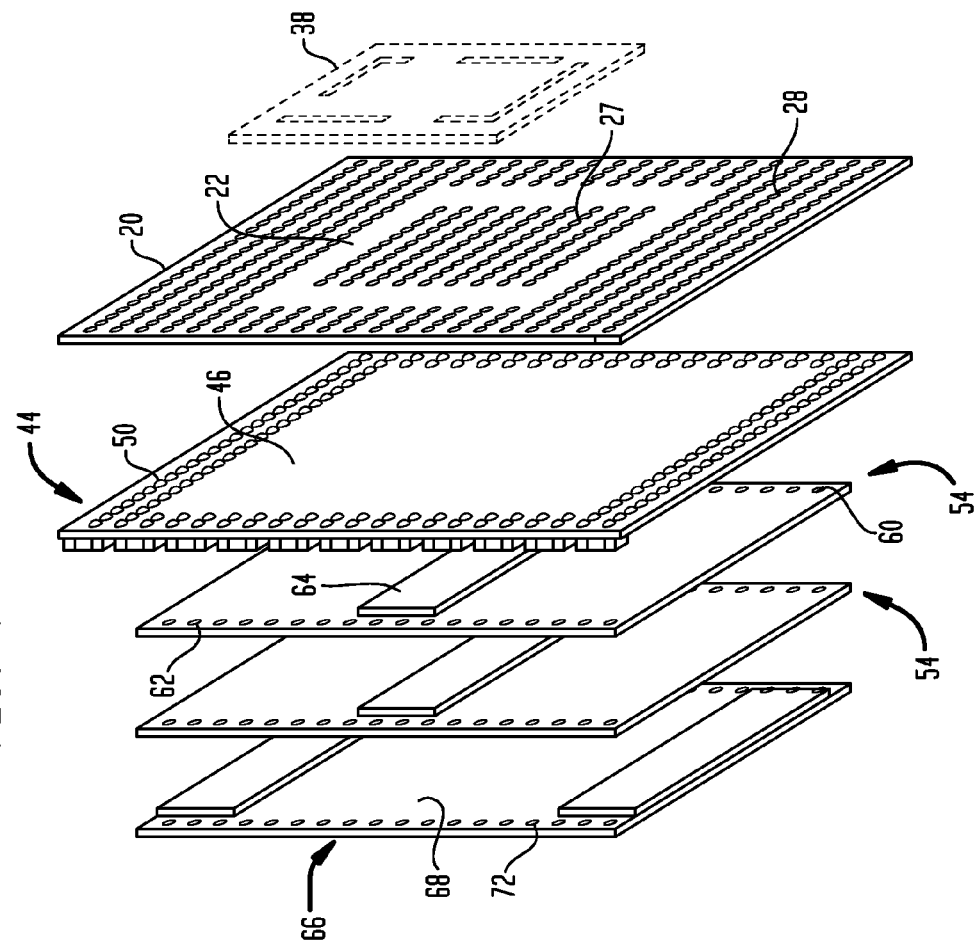
FIG. 4 is a diagrammatic exploded view of the module shown in FIGS. 1-3.
Figure 3:
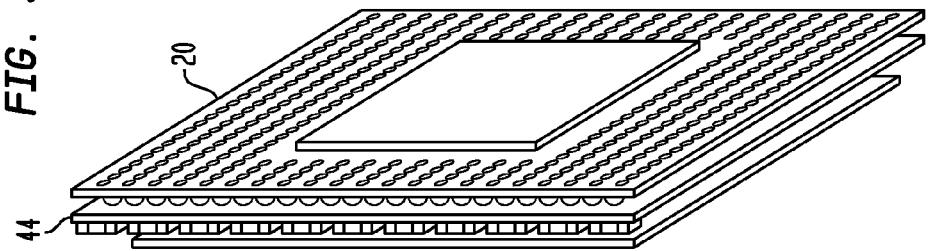
FIG. 3 is a diagrammatic bottom perspective view of the module shown in FIGS. 1 and 2.

An additional chip 38, schematically depicted in broken lines in FIG. 4, is mounted to the bottom surface of the bottom unit substrate 20. In the particular embodiment depicted, additional chip 38 is provided as part of a chip scale package or "CSP." As used in this disclosure, the term "chip scale package" refers to an assemblage of elements incorporating a chip and a package substrate having terminals electrically connected to the chip, the substrate having an area which is less than about 1.5 times, and desirably less than about 1.25 times, the area of the chip itself. The CSP substrate has terminals 42 arranged in an array corresponding to the array of bottom side chip connection terminals 26. The terminals 42 of the CSP are bonded to the bottom chip connection terminals, thereby mounting the CSP and chip 38 to the bottom surface of the bottom unit substrate. Additional chip 38 desirably is a chip which cooperates closely with ASIC 32. For example, the additional chip may be a Bluetooth protocol control chip, an image processing chip, a power control chip, or another chip which performs application processing, base band processing, or other control or operation functions of the portable communications device.

The module further includes an interposer 44. The interposer 44 is a circuit substrate, as for example, a flexible or rigid multilayer circuit panel. The interposer has a bottom side 46 (FIG. 4) and a top side 48 (FIG. 6). Lower terminals 50 (FIG. 4) are exposed at the bottom surface 46 of the interposer. The lower terminals 50 are depicted as covered by masses of electrically conductive bonding materials such as solder or the like. The interposer also has upper terminals 52 exposed at the top surface 48. The upper and lower terminals are provided in the peripheral region of the interposer. At least some of the upper terminals 52 are connected to at least some of the lower terminals 50. The array of lower terminals 50 may have more terminals or fewer terminals than the array of upper terminals 52. A set of passive components, which in this case incorporate discrete decoupling capacitors 54, is also provided on the interposer. Interposer 44 incorporates electrical interconnections (not shown) between the upper terminals 52 and lower terminals 48, and also connections between certain terminals and the passive components 54.

The module also includes a pair of DRAM units 54. Each DRAM unit 54 includes a DRAM chip 56 and a DRAM substrate 58. Each of the DRAM substrates desirably is a thin, single-layer circuitized substrate having a single layer of metallization on one surface. The single layer of metallization desirably includes metallic pads disposed along all four edges. Each such pad desirably is exposed at the lower surface of the substrate, and is also exposed through a hole in the substrate so that the pad is exposed at the upper surface as well. Thus, each such pad defines an upwardly-facing terminal and a downwardly-facing terminal. The terminals of the DRAM substrates include rows of chip connection terminals 60 extending along two opposite edges of the substrate, and rows of pass-through terminals 62 extending along two other edges of the substrate. At least some of the chip connection terminals 60 on the substrate in each unit 52 are connected to the DRAM chip 56 within that unit. Typically, the metallization layer includes traces (not shown) which extend from the chip connection terminals 60 to the central region of the substrate, where the traces are connected to the contacts of the DRAM chip mounted on the substrate. The connection between the traces and the chip itself may be covered by an encapsulant 64 (FIG. 4).

The module further includes a flash memory unit 66. The flash memory unit 66 includes a flash memory substrate 68 and a flash memory chip 70 (FIG. 6) attached to the flash memory substrate. The flash memory substrate 68 has rows of unit terminals 72 exposed at its bottom surface along two edges. These terminals 72 are disposed at locations and spacings corresponding to the locations and spacings of the pass-through terminals 62 in the DRAM unit substrates.

As seen in FIGS. 1, 2, 3, and 4, the bottom unit substrate 20 with the ASIC 34 and additional chip 38 thereon, the interposer 44, DRAM units 54, and flash unit 66 are stacked in that order, with the bottom unit substrate 20 at the bottom of the stack, and with interposer 44 disposed between the ASIC 34 and the lower-most DRAM unit 54. Thus, the interposer lies between the ASIC 34 (FIG. 6) and the DRAM and flash chips. The terminals of the various units are connected to one another by masses of electrically conductive bonding material. The terminals 72 of the flash unit substrate and the matching pass-through terminals 62 of the DRAM unit substrates are connected to one another so as to form vertical buses extending from some of the upper terminals on the interposer 44 to the flash unit. Also, corresponding chip connection terminals 60 of the DRAM substrates are connected to one another to form vertical buses extending upwardly from other upper terminals 52 of the interposer 44. These vertical buses extend adjacent the periphery of the stacked memory units. The DRAM chips are disposed near the center of the stack, inside the region enclosed by the stacked terminals and vertical buses. The lower terminals 50 (FIG. 2) of the interposer 44 are connected to the top side interconnection terminals 32 of the bottom unit substrate 20 by relatively large solder balls provided on the terminals 50. These solder balls in the peripheral regions of the interposer and bottom unit substrate surround the ASIC 34 and encapsulant 36 (FIG. 6).

The entire module provides a very compact structure with excellent connectivity between the various chips in the stack. The interposer allows for rerouting of signals conveyed between those chips disposed below the interposer and the memory chips disposed above the interposer. Stated another way, a wide variety of connections between the ASIC 34 and additional chip 38 (FIGS. 4 and 6) and the DRAM and flash chips can be accommodated. The close coupling and numerous interconnections between the ASIC 34 and the additional chip 38 provide for rapid interchange of data.

The module mounting terminals 26 (FIG. 4) on the bottom unit substrate are not occupied by any connections within the module itself. These module mounting terminals can be bonded by solder balls 80 (FIGS. 1 and 2) to mating contact pads on a larger circuit panel 82. The module provides excellent connectivity to the larger circuit panel 82. The solder balls or other bonding material 80 surround the chip scale package and additional chip 38. Because the chip scale package having additional chip 38 is very thin, the bottom unit substrate can be positioned close to circuit panel 82. Thus, the solder balls 80 can be small. This, in turn, facilitates the use of very closely spaced module mounting terminals 28, and allows for provision of numerous module mounting terminals and numerous interconnections to the larger circuit panel in a small area. Only a small portion of circuit panel is shown. In practice, the circuit panel 82 has numerous interconnections and additional electrical components mounted thereon. The additional components of a portable communications device are discussed further below. The module discussed above with reference to FIGS. 1-6 can be extremely compact. For example, the height $h_m$ of the module above the top surface of circuit panel 82 is less than about 1.7 mm, whereas the length $l_m$ of the module and width $w_m$ of the module (FIG. 1) are about 13 mm or less.

A mobile communications device in the form of a cellular telephone according to a further embodiment of the invention includes a housing or casing 84 (FIGS. 7 and 8) in the form of a generally flat, generally rectangular body having a thickness $t_c$ (FIG. 8) much less than its width $w_c$ (FIG. 7) and length $l_c$. The dimensions of the casing 84 desirably are close to those of a standard credit card. Thus, the length $l_c$ desirably is less than about 90 mm and most preferably about 85.60 mm, whereas the width $w_c$ desirably is less than about 65 mm and most desirably about 53.98 mm, and the thickness $t_c$ is less than about 2 mm. The cellular telephone includes a module as discussed above mounted to a circuit panel which is disposed within the casing. As will be appreciated, the compactness of the module greatly contributes to the ability to accommodate the required electronic components within the casing. As best seen in FIG. 9, the components disposed within casing 84 includes a local free space communications circuit in the form of a local radio transmitter and receiver circuit 86 with associated antenna. In the particular embodiment shown, the local radio transmitter and receiver circuit is a Bluetooth radio circuit. The components also include a cellular communications circuit 88 adapted to communicate with a public cellular network. In the particular embodiment shown, the cellular communications circuit includes a GSM and WCDMA transceiver block connected to an RF front end and GSM power amplifier and switch, and also connected to a WCDMA power amplifier and WCDMA duplexer. The exact form of the cellular communications circuit, of course, will vary with the type of cellular communications circuit to be used.

Figure 7:
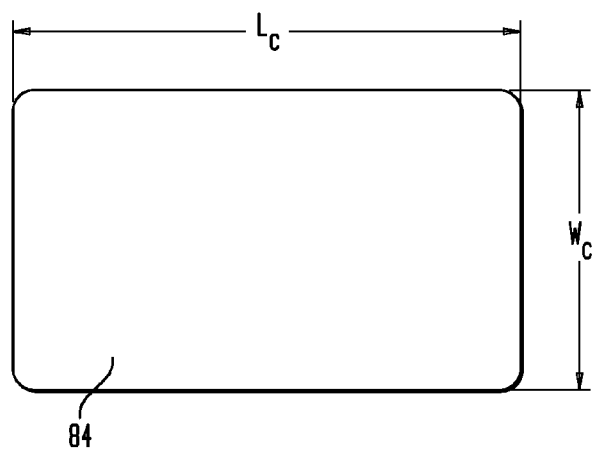
FIG. 7 is a diagrammatic plan view of a cellular telephone casing.
Figure 8:
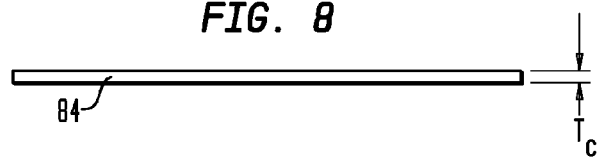
FIG. 8 is a diagrammatic elevational view of the casing shown in FIG. 7.

The cellular telephone further includes circuitry referred to herein as a control circuit 90, which is arranged to perform functions such as controlling the operation of the cellular communications circuit 88, processing signals representing both message information and control inputs, and the like. Merely by way of example, the control circuit 90 is arranged to accept information representing a telephone number to be dialed, pass that information through to the cellular communications circuit in an appropriate format for transmission to the network, and manage all of the numerous functions incorporated in a conventional cellular telephone. The control circuit 90 desirably also is arranged to process signals representing a message, as for example, audio or video signals, and to perform ancillary functions such as power management. The components of the control circuit desirably include some or all of the components physically mounted in the module, as for example, the flash memory, DRAM, ASIC and additional chip discussed above with reference to FIGS. 1-6. The control circuit 90 is arranged to receive signals representing user-generated control inputs through the local communications circuit 86. Stated another way, the user can provide control inputs to the cellular telephone via free space communications to circuit 86. Most preferably, the user provides control inputs during normal operation to the cellular telephone only through free space communications. It is unnecessary to provide the normal array of buttons, switches, and the like found on the housings of conventional cellular telephones on the casing 84 (FIGS. 7 and 8). As used in this disclosure, the term "control inputs" includes inputs other than an on/off input, and "normal operation" excludes turning the cell phone on or off. Thus, casing 84 may be provided with an on/off switch (not shown), or other device for directly receiving user input. For example, the casing may be somewhat flexible, and a sensor may be provided to detect deliberate flexing of the casing by the user to turn the device on or off. "Normal operation" excludes operations required to program the cell phone. Thus, the casing operationally may have switches or other input devices used during programming.

Figure 11:
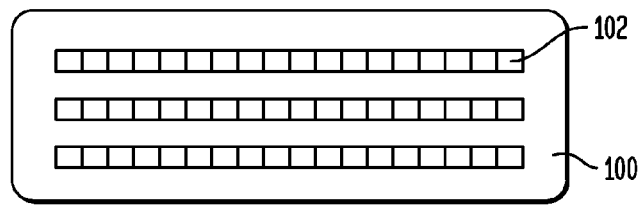
FIG. 11 is a diagrammatic view of a keyboard.

Essentially any input/output device which can communicate with the local communications circuit 86 can be used to provide user control inputs. For example, a Bluetooth-enabled keyboard 100 (FIG. 11) having an array of keys 102 and internal circuitry for translating key depressions by the user into radio signals can be employed. The local communications circuit receives such radio signals and translates the same into conventional representations of alphanumeric data, which serve as the control signal inputs.

A conventional Bluetooth-enabled microphone can be used to provide both voice message data and control data. However, a preferred device or accessory in accordance with yet another embodiment of the invention is partially depicted in FIGS. 9 and 10. This device incorporates a housing 104 adapted to engage the ear of the user. The housing 104 may be generally of the conventional shape used for single-ear cellular headsets. The housing 104 may include a boom or extension 106, which projects forwardly from the user's ear when the housing is engaged with the ear, so that the forward end 106 of the boom will lie near to the user's mouth. The device incorporates a microphone 108 (FIG. 9) typically mounted near the forward end of the boom, as well as an earphone 110 mounted to the housing so that the earphone will be positioned near the user's ear canal when the device is engaged with the user's head. The device desirably further includes an audio processing circuit 112 and a free space communication circuit 114, such as a Bluetooth radio circuit, or other circuit compatible with the local communications circuit 86 of the cellular telephone discussed above.

The foregoing components of the accessory may be generally similar to those used in conventional cellular wireless headsets.

Figure 10:
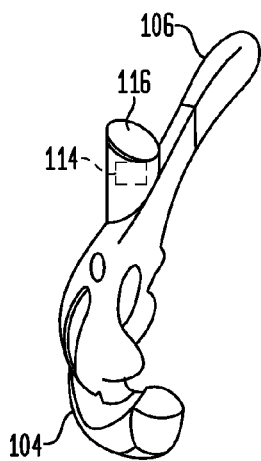
FIG. 10 is a diagrammatic perspective view of the accessory shown in FIG. 9.

The device according to this aspect of the present invention, however, further includes an electronic camera 114 (FIG. 9). The electronic camera desirably includes a component such as a CCD or other imaging chip adapted to sense light impinging on the chip, together with an optical system which typically includes one or more lenses or diffractive elements for focusing light from a scene onto the imaging chip, and may also include image processing elements. The electronic camera is connected to the wireless communications circuit 112. As best seen in FIG. 10, the camera module 114 is housed within housing 104 so that the camera module has line of sight through a clear opening or window 116 in the housing, facing forwardly, in the same direction as the boom 106, so that the camera looks forwardly when the housing 104 is held on the user's ear. Of course, the particular housing shape depicted in FIG. 10 is entirely arbitrary. Integration of a camera into a single-ear wireless headset provides a unique combination of functionality not heretofore achieved, including the ability to provide video representing the user's point of view without the bulk and inconvenience associated with conventional camera-equipped devices.

As discussed above, the cellular telephone can be controlled by user inputs wirelessly transmitted to the local communications circuit 86 (FIG. 9). Merely by way of example, the control circuit 90 can be arranged to interpret certain voice commands as control signals, as for example, where the user speaks the word "dial" and then, after a pause, speaks numerals. Other, more sophisticated forms of voice control can be employed.

The embodiment discussed above provides a compact cellular telephone. Housing 84 can be carried in a concealed location on the user's body, whereas the headset or accessory 104 can be worn unobtrusively by the user. The user can access the full functionality of the cellular telephone without the need to manipulate tiny buttons on a miniature keypad. Similar advantages can be obtained in other mobile or portable communications devices, as for example, PDAs.

In a variant of this approach, the housing of a cellular telephone can be configured so that it may be worn on the user's wrist or neck, like a wrist watch or medallion. the same compact arrangement of components can be used.

As numerous variations and combinations of the features discussed above can be utilized without departing from the present invention, the foregoing description of the preferred embodiments should be taken by way of illustration rather than by limitation of the present invention. It is therefore to be understood that numerous modifications may be made to the illustrative embodiments and that other arrangements may be devised without departing from the spirit and scope of the present invention as defined by the appended claims.

The invention claimed is:

1. A wireless device comprising:
 a wireless communications circuit mounted in a wireless headset and adapted to provide control data used to wirelessly control a cellular telephone device separate from the wireless headset;
 wherein the wireless headset is adapted to engage a portion of a head a user;
 an audio output component communicatively coupled to the wireless communications circuit to receive signals from the wireless communications circuit and deliver audio output to the user representing the received signals;
 an audio input component, mounted in the wireless headset, communicatively coupled to the wireless communications circuit to supply audio signals, representing the user's voice, to the wireless communications circuit;
 wherein at least one of the audio input component mounted in the wireless headset or the wireless communications circuit mounted in the wireless headset is configured to interpret voice commands received from the user without other input from the user, and, based on the interpreted voice commands create the control data which is used to wirelessly control the cellular telephone device; and
 a camera component, including an imaging chip adapted to sense light impinging on the imaging chip, mounted in the wireless headset and communicatively coupled to the wireless communications circuit for supplying image signals representing images captured by the camera component to the wireless communications circuit, the camera component configured to face in the same direction as the user when the wireless headset is engaged with the portion of the head of the user.

2. The wireless device as claimed in claim 1, wherein the camera component further comprises an imaging chip adapted to sense light on the imaging chip.

3. The wireless device as claimed in claim 1, wherein the camera component is a video camera.

4. The wireless device as claimed in claim 1, wherein the camera component is a digital still camera.

5. The wireless device as claimed in claim 1, wherein the wireless device is Bluetooth-enabled.

6. The wireless device as claimed in claim 1, further comprising an audio processing circuit mounted in the wireless headset.

7. The wireless device as claimed in claim 1, wherein the wireless communications circuit is configured to provide communication with a wireless network.

8. The wireless device as claimed in claim 1, further comprising a window through which the camera component receives images.

9. The wireless device as claimed in claim 1, wherein the portion of the head is an ear of the user.

10. The wireless device as claimed in claim 9, wherein the wireless headset includes a portion that extends forwardly from the ear of the user when the wireless headset is engaged with the user's ear.

11. The wireless device as claimed in claim 1, wherein the wireless headset is adapted to lie along one side of the user's head with the audio output adjacent an auditory canal of the user.

12. The wireless device as claimed in claim 1, wherein the wireless communications circuit is configured to interpret the voice commands from the user.

13. The wireless device as claimed in claim 1, wherein the audio input component is configured to interpret the voice commands from the user without other input from the user.

14. A system comprising:
a wireless communications circuit mounted in a wireless headset and adapted to provide control data used to wirelessly control a cellular telephone device separate from the wireless headset;
the wireless headset adapted to engage a portion of a head of a user;
an audio output component mechanically mounted in the wireless headset and communicatively coupled to the wireless communications circuit to receive signals from the wireless communications circuit and deliver sound to the user representing the received signals;
an audio input component, mounted in the wireless headset. mechanically mounted in the wireless headset and communicatively coupled to the wireless communications circuit to supply audio signals representing the user's voice to the wireless communications circuit;
wherein at least one of the audio input component mounted in the wireless headset or the wireless communications circuit mounted in the wireless headset is configured to interpret voice commands received from the user without other input from the user, and, based on the interpreted voice commands create the control data which is used to wirelessly control the cellular telephone device; and
a camera component, including an imaging chip adapted to sense light impinging on the imaging chip, mounted in the wireless headset and communicatively coupled to the wireless communications circuit for supplying image signals representing images captured by the camera component to the wireless communications circuit, the camera component configured to face in the same direction as the user when the wireless headset is engaged with the portion of the head of the user.

15. The system as claimed in claim 14, wherein the audio output component is an earphone.

16. The system as claimed in claim 14, wherein the audio input component is a microphone.

17. The system as claimed in claim 14, wherein the wireless communications circuit receives input from at least one of the audio input component, the audio output component, or the camera component through wireless communication.

18. The system as claimed in claim 14, wherein the audio input component is configured to receive and interpret the voice commands without other input from the user.

19. One or more non-transitory computer readable storage media storing one or more instructions which, when executed by one or more processors, cause the one or more processors to perform:
providing control data, by a wireless communications circuit mounted in a wireless headset adapted to engage a portion of a head a user, the control data being used to wirelessly control a cellular telephone device separate from the wireless headset;
receiving signals from the wireless communications circuit and delivering audio output to the user representing the received signals, by an audio output component communicatively coupled to the wireless communications circuit;
supplying audio signals, representing the user's voice, to the wireless communications circuit, by an audio input component mounted in the wireless headset and communicatively coupled to the wireless communications circuit;
interpreting voice commands received from the user by at least one of the audio input component mounted in the wireless headset or the wireless communications circuit mounted in the wireless headset without other input from the user, and, based on the interpreted voice commands, creating, by the wireless communications circuit, control data which is used to wirelessly control the cellular telephone device; and
supplying image signals representing images captured by a camera component including an imaging chip adapted to sense light impinging on the imaging chip to the wireless communications circuit, by the camera component mounted in the wireless headset and communicatively coupled to the wireless communications circuit configured to face in the same direction as the user when the wireless headset is engaged with the portion of the head of the user.

* * * * *